April 11, 1950 — A. A. DICKE, JR — 2,504,010

LIMIT SWITCH INSTRUMENT

Filed Jan. 25, 1946 — 2 Sheets-Sheet 1

INVENTOR
Allen A. Dicke, Jr.
ATTORNEYS

April 11, 1950  A. A. DICKE, JR  2,504,010
LIMIT SWITCH INSTRUMENT
Filed Jan. 25, 1946  2 Sheets-Sheet 2
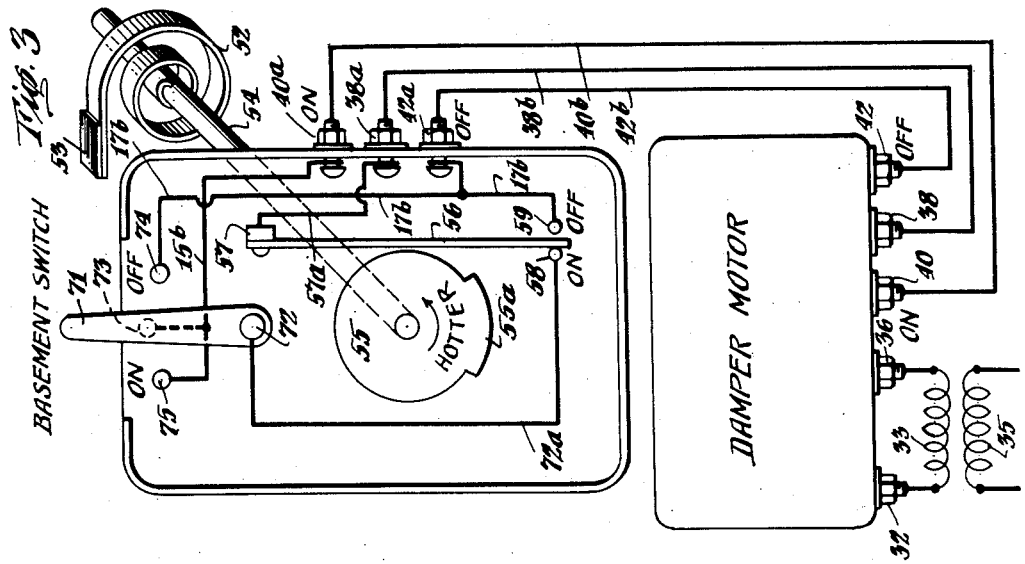
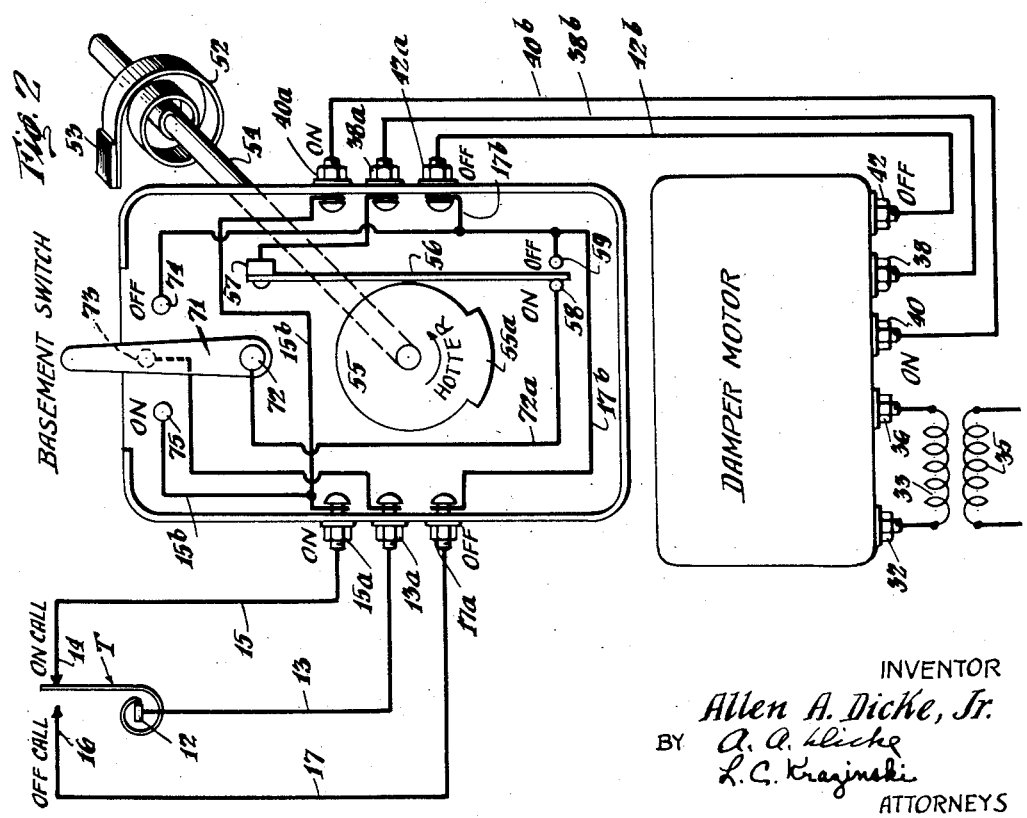
INVENTOR
Allen A. Dicke, Jr.
BY A. A. Dicke
L. C. Krazinski
ATTORNEYS Patented Apr. 11, 1950

2,504,010

UNITED STATES PATENT OFFICE 2,504,010

LIMIT SWITCH INSTRUMENT

Allen A. Dicke, Jr., Upper Montclair, N. J., assignor, by mesne assignments, to Crown Controls Company, Inc., New Bremen, Ohio, a corporation of Ohio Application January 25, 1946, Serial No. 643,343

11 Claims. (Cl. 236—9)

This invention relates to an improved limit switch instrument, particularly for use in a system having a thermostat controlled by the temperature in a space to be heated, a damper regulator motor or other heat-supply control device, and a secondary control device, such as a limit switch instrument, controlled by the temperature of the flue of a furnace, the temperature of the bonnet of a hot-air furnace, the temperature of the water in a hot-water furnace, or the pressure of the steam in a steam furnace.

In such systems it has been customary heretofore to provide in addition to a room thermostat and a heat-supply control device, such as a damper regulator motor, a high-limit switch instrument so arranged that when the controlling temperature or pressure reaches a certain high point, the heat-supply control device is set for reduced heat supply even though the room thermostat may not be satisfied and may be calling for additional heat. The heat-supply control device is usually provided with a "basement switch," i. e., a switch having a "normal" position and "on" position, and sometimes an "off" position.

The basement switch heretofore has been so connected that when moved to "on" position, it is master not only over the room thermostat but also over the high-limit switch instrument. As a result, if the user moved the basement switch to "on" position while refueling and forgot to return it to "normal" position, combustion at a high rate resulted and might continue to a dangerous point, since the high-limit control was no longer able to control the heat-supply control devivce to reduced heat condition.

An object of the invention is to provide an improved limit switch instrument for use in a temperature-control system comprising a room thermostat, a heat-supply control device, and a high-limit control switch instrument, which instrument embodies a manually-operated "basement swtich" so arranged that the movement of the basement switch from "normal" to "on" position will be ineffective to control the heat-supply control device to increased heat position when the high-limit switch is in "off" position.

In temperature control systems as constructed heretofore, it has also been customary to provide a low-limit switch, viz., a device so arranged that when the controlling temperature or pressure dropped to a certain predetermined point, the heat-supply controlling device would be actuated to increased heat position, even though the room thermostat called for decreased heat supply. The purpose of such a switch is to prevent fires from going out during periods of mild weather when the room thermostat may be satisfied for long periods of time. When such control systems were installed while the furnace was cold, the low-limit switch would call for increased heat supply and the installer would not be able to test the system by adjusting the room thermostat.

It is an object of the present invention to provide a low-limit switch instrument embodying therein a "basement switch" so arranged that the "basement switch" is master over the low-limit switch.

It has also been customary heretofore to provide temperature control systems embodying such a high-limit switch and such a low-limit switch in a single structure (usually actuated by a single temperature or pressure-responsive element), and a damper motor including a basement switch which is master over the thermostat and over the low-limit and high-limit switches.

Another object is to provide such a system comprising a room thermostat, a heat-supply control device, a high-limit control switch, a low-limit control switch, and a manually-operated "basement switch" so arranged that the movement of the basement switch from "normal" to "on" position will be ineffective to control the heat-supply control device to increased heat position when the high-limit switch is in "off" position, which is, however, so arranged that when the basement switch is moved to the "off" position the heat-supply control device will be moved to its "off" position (reduced heat supply) even though the low-limit switch may be calling for increased heat supply.

Another object is to provide a system including a heat-supply control device, a high-limit switch, a low-limit switch, and a basement switch, the parts being so arranged that the high-limit switch is master over the basement switch but that the basement switch is master over the low-limit switch.

Another object of the invention is to provide a high-limit switch and/or a low-limit switch and a basement switch in the same instrument so that the basement switch, frequently furnished as an integral part of a damper regulator motor, may be omitted and the wiring greatly simplified.

Further objects and advantages of this invention will be apparent from consideration of the specification as illustrated by the accompanying drawings of several illustrative embodiments of the invention, wherein:

Fig. 2 illustrates a device and system similar to Fig. 1 but omitting the low-limit switch;

Fig. 3 illustrates a device similar to Fig. 2 but omitting the room thermostat.

Figure 1:
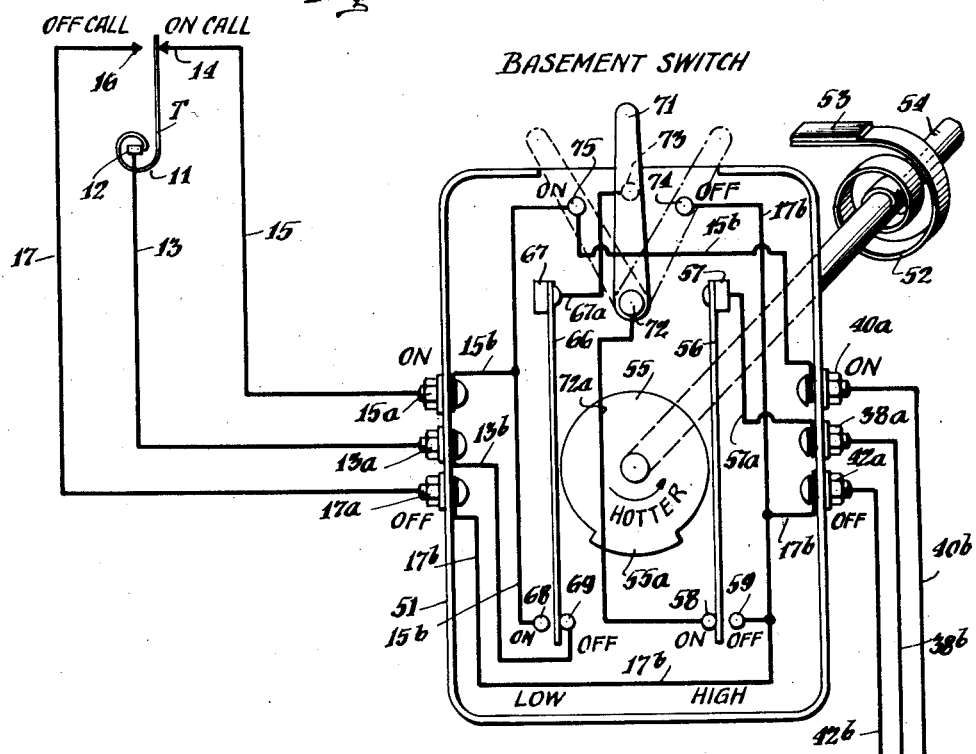
Fig. 1 depicts, more or less schematically, a temperature-control system embodying a room thermostat, a damper-regulator motor and a unitary structure comprising a high-limit switch, a low-limit switch, and a basement switch, the parts being so arranged that the high-limit switch is master over the basement switch, but the basement switch is master over the low-limit switch.
Figure 1:
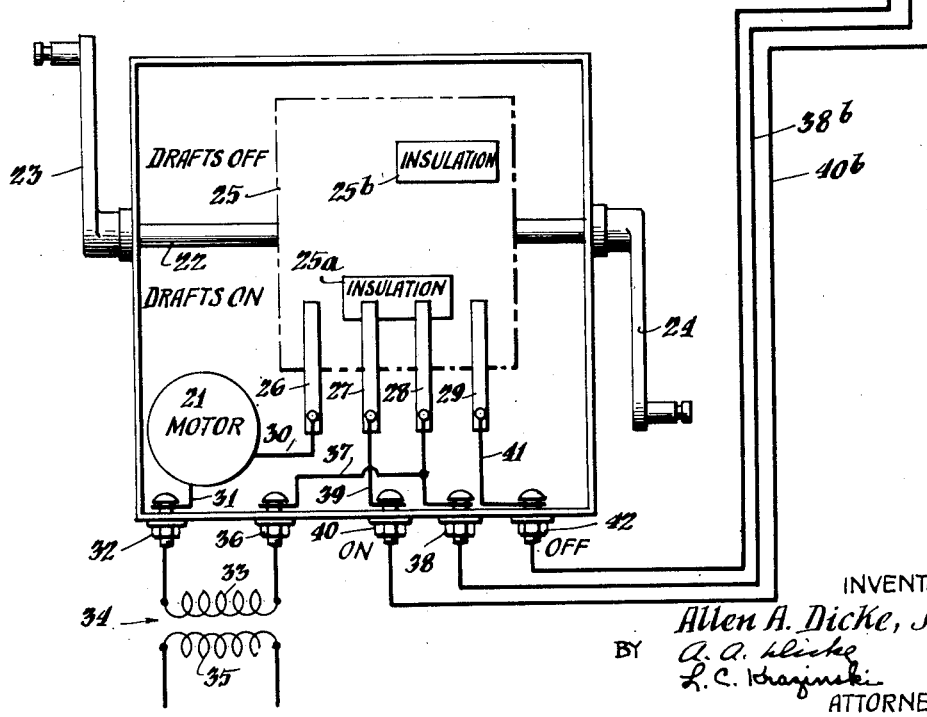

Referring to said drawings, T represents generally a thermostat, such as a room thermostat, of any desired construction, comprising a bimetal element 11 supported on a bracket 12 to which is connected a conductor 13. 14 represents the "on call" contact to which is connected conductor 15, and 16 represents the "off call" contact to which is connected the conductor 17. The heat-supply control device may consist of a damper regulating motor of standard construction or may conceivably be represented by a relay for controlling an oil burner or the operation of the motor of a stoker or by an electrically-operated gas valve.

In the form shown, the heat-supply control device consists of an electric motor 21 connected through suitable gearing (not shown) to drive, at a much reduced speed, the shaft 22 which carries cranks 23 and 24 as for operating the draft and check dampers of a solid-fuel heating plant. Usual or suitable commutating means are provided. As shown, this takes the form of a metal tube 25, shown in development in dotted lines, carried for rotation by shaft 22. It is formed with two insulating areas 25a and 25b. Cooperating with said tube are four brushes 26, 27, 28, and 29. Brush 26 is connected through conductor 30 with motor 21, the other side of which is connected through conductor 31 and terminal 32 to the secondary winding 33 of a transformer 34, whose primary winding 35 is connected to a suitable source of alternating current. The other side of the winding 33 is connected through terminal 36 and conductor 37 with brush 28 and with terminal 38. Brush 27 is connected through conductor 39 to "on" terminal 40. Brush 29 is connected through conductor 41 with the "off" terminal 42.

The high-low basement switch

In the form selected for illustrating the present invention, this switch instrument comprises a casing 51 which houses the high-limit switch, the low-limit switch, and their operating means, as well as the basement switch.

52 represents any thermo-responsive element, such as coiled bi-metal, one end of which is attached to an abutment member 53 and the other end of which is attached to a rotatable shaft 54, the other end of which is connected for rotating the cam-operating member 55. In accordance with usual construction, the shaft 54 is suitably housed in a rearwardly-extending tube which, in use, extends into the bonnet of a hot air furnace or the flue pipe of any type of furnace.

The high-limit switch may consist essentially of a switch blade 56 supported on bracket 57, its free end being biased against the "on" contact 58. The arm 56 is sufficiently flexible to that when operating cam 55 is rotated so that its high point 55a strikes the arm 56, said arm is moved away from "on" contact 58 into engagement with the "off" contact 59.

The low-limit switch is shown as consisting of a flexible contact blade 66 supported by bracket 67 and normally engaging "off" contact 69 but it may be moved by extension 55a of the cam to move away from contact 69 into engagement with "on" contact 68.

The basement switch consists essentially of a switch lever 71 pivoted at 72 and normally in electrical connection with contact button 73. It may be moved in one direction so as to leave the contact 73 and engage the "off" contact button 74. Similarly, it may be moved in the other direction to engage the "on" contact button 75.

The housing 51 is shown provided with terminals as follows: 15a to which conductor 15 is attached, 13a to which conductor 13 is attached, and 17a to which conductor 17 is attached.

Similarly, the housing carries terminals 40a connected through conductor 40b with terminal 40 on the motor, as well as terminal 38a which is connected through conductor 38b with terminal 38 on the motor, and also terminal 42a which, through conductor 42b, is connected to terminal 42 on the motor.

Internal connections are as shown, viz., terminal 15a is connected through conductor 15b to the "on" contact 68 of the low-limit switch, the "on" contact 75 of the basement switch, and the "on" terminal 40a, and thence to the "on" terminal 40 of the motor. Terminal 13a is connected through conductor 13b with the "off" contact 69 of the low-limit switch. Terminal 17a is connected through conductor 17b to the "off" contact 59 of the high-limit switch, to the "off" contact 74 of the basement switch, and to the "off" terminal 42a which, through conductor 42b, is connected to the "off" terminal 42 of the motor. The bracket 67 is connected to the contact 73 of the basement switch through conductor 67a. The pivot 72 of the basement switch is connected through conductor 72a with the "on" contact 58 of the high-limit switch. The bracket 57 of the high-limit switch is connected through conductor 57a with the terminal 38a and thence through conductor 38b with the common terminal 38 of the motor.

Operation

The thermostat T and the motor are shown in a position where an "on call" operation has just been completed. The motor 21 and shaft 22 are stationary because "on" brush 27 is standing on insulation 25a. If now, the temperature to which the limit-switch bi-metal 52 is subjected rises to a certain extent, cam 55 will rotate counterclockwise until extension 55a thereon strikes switch blade 56, moving it from contact 58 to contact 59. A circuit is thereby established from transformer 34 through motor 21, conductor 30, brush 26, commutator tube 25, brush 29, conductor 41, terminal 42, conductor 42b, terminal 42a, conductor 17b, contact 59, blade 56, bracket 57, conductor 57a, terminal 38a, conductor 38b, terminal 38, conductor 37, terminal 36, back to the transformer. Therefore, the motor will operate until shaft 22 has been given a half-rotation and insulation 25b appears under the brush 29. This operation is independent of the position of the thermostat and of the basement switch. Thus, if the basement switch had been set at its "on" position it would have been unable to prevent the "off" operation just described, the internal circuit being complete from terminal 42a to terminal 38a merely through "off" contact 59 and contact blade 56. If now the basement switch is moved to the "on" position, an "on" operation is not brought about since the "on" circuit through terminal 40a, conductor 15b, contact button 75, conductor 15b, and contact 68 is interrupted at that point. This is very important since it assures that the high-limit switch is master over the basement switch. Thus, if the user should leave the basement switch on the "on" position, it could not prevent an "off" operation upon excessive increase in temperature in the bonnet or stack which would represent a great fire hazard. Similarly, if the drafts have been turned off as a result of excessive temperatures in the bonnet or stack, it will not be possible to overcome its safeguarding action by moving the basement switch to the "on" position. The reason for this result is that the circuit is so arranged that the "off" circuit is dependent only upon the high-limit switch and is independent of the basement switch and of the thermostat.

It will be noted, however, that the basement switch has mastery over the low-limit switch. Thus, if the temperature in the bonnet or the stack is so low that the low-limit switch is moved to the "on" position (which may occur when installation takes place in a cold furnace), the installation man may, in order to test the installation, move the basement switch to the "off" position and thereby secure an operation, irrespective of the position of the room thermostat.

Assuming that the motor is in the position shown, drafts on, as a result of the operation of the low limit switch, and that the basement switch is now moved to the "off" position, it will be noted that a circuit is established from the transformer through the motor 21, brush 26, conductor 30, tube 25, brush 29, conductors 41, 42b, 17b, contact button 74, lever 71, conductor 72a, "on" contact 58, blade 56, conductor 57a, conductor 38b, terminal 38, conductor 37, back to the transformer. This results in a half revolution of shaft 22 until insulation 25b moves under brush 29. Thus, a drafts-off operation is completed in spite of the fact that the low-limit switch is in "on" position.

It will be noted that in the form shown in Fig. 2, the low-limit switch is omitted. The reference numerals employed are the same as in Fig. 1 insofar as the parts are common. It will be noted that the basement switch may be used to move the motor from an "on" to an "off" position, or vice versa, even contrary to the call of the room thermostat. However, if the high-limit switch is in the "off" position, movement of the basement switch to the "on" position will be ineffective because the "off" circuit is complete through blade 56 and contact 59. Therefore, the high-limit switch controls the damper motor to the "off" position upon a rise in temperature, irrespective of the position of the basement switch or of the room thermostat.

Fig. 3 illustrates a high-limit switch instrument controlling a damper motor of the same construction as that shown in Fig. 1 without the use of a room thermostat. This application is useful in larger buildings where the rate of combustion is desirably controlled, not by the temperature in any part of the space to be heated, but by the temperature in the bonnet or the stack or the water in a hot water system, or by the steam pressure in any steam system. The high-limit switch is normally in the "on" position, i. e., until the desired temperature or pressure is reached. When this occurs, the damper motor is operated to the off" position, irrespective of the position of the basement switch. This occurs because the "off" circuit is complete through the blade 56 and the "off" contact 59. However, if the high-limit switch is in the "on" position and the basement switch is moved to the "off" position, an "off" operation will occur, the circuit being through the motor 21, brush 26, commutator tube 25, brush 29, conductors 41, 42b, 17b, contact button 74, switch lever 71, conductor 72a, contact 58, blade 56, conductor 57a, conductors 38b and 37, back to the transformer.

In the form shown in Fig. 3, the basement switch is subsidiary to the high-limit switch when the high-limit switch is in the "off" position. However, when the high-limit switch is in the "on" position, the damper motor may be turned off by operating the basement switch to the "off" position.

It will be noted that the construction shown and described will serve admirably to accomplish the objects stated above. It is to be understood, however, that the constructions disclosed above are intended merely as illustrative of the invention and not as limiting as various modifications therein may be made without departing from the invention as defined by a proper interpretation of the claims which follow.

I claim:

1. A secondary switch device for use in a temperature control system adapted to control the rate of operation of a heat supply device for supplying heat to a space, such as a furnace, which system is of the class which includes a thermostat to be located in said space, and heat supply control means adapted to be electrically controlled by said thermostat to control the rate at which said heat supply device supplies heat to said space; said secondary switch device comprising a unitary instrument adapted to be connected between said thermostat and said heat supply control means and so associated with said heat supply device as to be responsive to a condition existing therein, said unitary instrument including (a) a high-limit switch adapted to cause the heat supply to be reduced upon the attainment of a predetermined maximum condition in said heat supply device irrespective of the space thermostat, (b) a low-limit switch adapted to cause the heat supply to be increased upon the attainment of a predetermined minimum condition in said heat supply device irrespective of the space thermostat, said unitary structure also including (c) a manually operable switch adapted to control the operation of said heat supply control means, irrespective of the space thermostat.

2. A secondary switch device for use in a temperature control system adapted to control the rate of operation of a heat supply device for supplying heat to a space, such as a furnace, which system is of the class which includes a thermostat to be located in said space, and heat supply control means adapted to be electrically controlled by said thermostat to control the rate at which said heat supply device supplies heat to said space; said secondary switch device comprising a unitary instrument adapted to be connected between said thermostat and said heat supply control means and so associated with said heat supply device as to be responsive to a condition existing therein, said unitary instrument including (a) a high-limit switch adapted to cause the heat supply to be reduced upon the attainment of a predetermined maximum condition in said supply device irrespective of the space thermostat, and (b) a manually operable switch adapted to control the operation of said heat supply control means, irrespective of the space thermostat.

3. A secondary switch device for use in a temperature control system adapted to control the rate of operation of a heat supply device for supplying heat to a space, such as a furnace, which system is of the class which includes a thermostat to be located in said space, and heat supply control means adapted to be electrically controlled by said thermostat to control the rate at which said heat supply device supplies heat to said space; said secondary switch device comprising a unitary instrument adapted to be connected between said thermostat and said heat supply control means and so associated with said heat supply device as to be responsive to a condition existing therein, said unitary instrument including (a) a high-limit switch adapted to cause the heat supply to be reduced upon the attainment of a predetermined maximum condition in said supply device irrespective of the space thermostat, (b) a low-limit switch adapted to cause the heat supply to be increased upon the attainment of a predetermined minimum condition in said heat supply device irrespective of the space thermostat, said unitary structure also including (c) a manually operable switch adapted to control the operation of said heat supply control means, irrespective of the space thermostat, said elements being so arranged and connected that the manual switch has mastery over the low-limit switch but the high-limit switch has mastery over the manual switch.

4. A secondary switch device for use in a temperature control system adapted to control the rate of operation of a heat supply device for supplying heat to a space, such as a furnace, which system is of the class which includes a thermostat to be located in said space, and heat supply control means adapted to be electrically controlled by said thermostat to control the rate at which said heat supply device supplies heat to said space; said secondary switch device comprising a unitary instrument adapted to be connected between said thermostat and said heat supply control means and so associated with said heat supply device as to be responsive to a condition existing therein, said unitary instrument including (a) a low-limit switch adapted to cause the heat supply to be increased upon the attainment of a predetermined minimum condition in said heat supply device irrespective of the space thermostat, said unitary structure also including (b) a manually operable switch adapted to control the operation of said heat supply control means, irrespective of the space thermostat.

5. A secondary switch device for use in a temperature control system adapted to control the rate of operation of a heat supply device for supplying heat to a space, such as a furnace, which system is of the class which includes a thermostat to be located in said space, and heat supply control means adapted to be electrically controlled by said thermostat to control the rate at which said heat supply device supplies heat to said space; said secondary switch device comprising a unitary instrument adapted to be connected between said thermostat and said heat supply control means and so associated with said heat supply device as to be responsive to a condition existing therein, said unitary instrument including (a) a high-limit switch adapted to cause the heat supply to be reduced upon the attainment of a predetermined maximum condition in said heat supply device irrespective of the space thermostat, and (b) a manually operable switch adapted to control the operation of said heat supply control means, irrespective of the space thermostat, said elements being so arranged that the manual switch has mastery over the thermostat but the high-limit switch has mastery over the manual switch.

6. A secondary switch instrument for use in a temperature control system adapted to control the rate of operation of a heat supply device for supplying heat to a space, such as a furnace, which system is of the class which includes a thermostat to be located in said space, and heat supply control means adapted to be electrically controlled by said thermostat to control the rate at which said heat supply device supplies heat to said space; said secondary switch instrument being adapted to be connected between said thermostat and said heat supply control means and so associated with said heat supply device as to be responsive to a condition existing therein, said secondary switch instrument including (a) a high-limit switch adapted to cause the heat supply to be reduced upon the attainment of a predetermined maximum condition in said supply device irrespective of the space thermostat, (b) a low-limit switch adapted to cause the heat supply to be increased upon the attainment of a predetermined minimum condition in said heat supply device irrespective of the space thermostat, said secondary switch device also including (c) a manually operable switch adapted to control the operation of said heat supply control means, irrespective of the space thermostat, said elements being so arranged and connected that the manual switch has mastery over the low-limit switch but the high-limit switch has mastery over the manual switch.

7. A secondary switch instrument for use in a temperature control system adapted to control the rate of operation of a heat supply device for supplying heat to a space, such as a furnace, which system is of the class which includes a thermostat to be located in said space, and heat supply control means adapted to be electrically controlled by said thermostat to control the rate at which said heat supply device supplies heat to said space; said secondary switch instrument being adapted to be connected between said thermostat and said heat supply control means and so associated with said heat supply device as to be responsive to a condition existing therein, said secondary switch instrument including (a) a high-limit switch adapted to cause the heat supply to be reduced upon the attainment of a predetermined maximum condition in said heat supply device irrespective of the space thermostat, and (b) a manually operable switch adapted to control the operation of said heat supply control means, irrespective of the space thermostat, said high-limit switch comprising a switch arm normally in engagement with a contact which is connected to the common member of a plural throw manual switch, said switch arm being arranged to move in response to increase in a condition in the heat supply device from said first contact to a second contact which is adapted to be connected to control the heat supply control device to reduce the supply of heat, said common member of said plural throw switch being normally in engagement with a contact connected to a terminal adapted to be connected to the common line of the space thermostat, said common member of said manual switch being movable at will from its normal contact to a contact connected to a terminal adapted to be connected to the "on call" contact of the space thermostat and connected also to a terminal adapted to be connected to control the heat supply control device to increase the supply of heat, whereby said high-limit switch may reduce the heat supply whether the manual switch is in normal position or in contact with the second contact mentioned, irespective of the space thermostat.

8. A secondary switch instrument for use in a temperature control system adapted to control the rate of operation of a heat supply device for supplying heat to a space, such as a furnace, which system is of the class which includes a thermostat to be located in said space, and heat supply control means adapted to be electrically controlled by said thermostat to control the rate at which said heat supply device supplies heat to said space; said secondary switch instrument being adapted to be connected between said thermostat and said heat supply control means and so associated with said heat supply device as to be responsive to a condition existing therein, said secondary switch instrument including (a) a high-limit switch adapted to cause the heat supply to be reduced upon the attainment of a predetermined maximum condition in said heat supply device irrespective of the space thermostat, and (b) a manually operable switch adapted to control the operation of said heat supply control means, irrespective of the space thermostat, said high-limit switch comprising a switch arm normally in engagement with a contact which is connected to the common member of a plural throw manual switch, said switch arm being arranged to move in response to increase in a condition in the heat supply device from said first contact to a second contact which is adapted to be connected to control the heat supply control device to reduce the supply of heat, said common member of said plural throw switch being normally in engagement with a contact connected to a terminal adapted to be connected to the common line of the space thermostat, said common member of said manual switch being movable at will from its normal contact to a contact connected to a terminal adapted to be connected to the "on call" contact of the space thermostat and connected also to a terminal adapted to be connected to control the heat supply control device to increase the supply of heat, and said common member of said manual switch being also movable at will to a contact connected to a terminal adapted to be connected to the "off call" contact of the space thermostat and connected also to a terminal adapted to be connected to control the heat supply control device to decrease the supply of heat, whereby said high-limit switch may reduce the heat supply whether the manual switch is in normal position or in contact with the second contact mentioned, irrespective of the space thermostat.

9. A secondary switch instrument for use in a temperature control system adapted to control the rate of operation of a heat supply device for supplying heat to a space, such as a furnace, which system is of the class which includes a heat supply control means adapted to control the rate at which said heat supply instrument supplies heat to said space; said secondary switch device being adapted to be connected to said heat supply control means and so associated with said heat supply device as to be responsive to a condition existing therein, said secondary switch instrument including (a) a high-limit switch adapted to cause the heat supply to be reduced upon the attainment of a predetermined maximum condition in said heat supply device, and (b) a manually operable switch adapted to control the operation of said heat supply control means, said high-limit switch comprising a switch arm normally in engagement with a contact which is connected to the common member of a plural throw manual switch, said switch arm being arranged to move in response to increase in a condition in the heat supply device from said first contact to a second contact which is adapted to be connected to control the heat supply control device to reduce the supply of heat, said common member of said plural throw switch being normally in engagement with a contact connected to a terminal adapted to be connected to control the heat supply control device to increase the heat supply, and said common member of said manual switch being movable at will from its normal contact to a contact connected to a terminal adapted to be connected to the heat supply control device to decrease the supply of heat, whereby said high-limit switch may reduce the heat supply irrespective of the position of the manual switch, and the manual switch may control the heat supply control device to decrease the heat supply irrespective of the position of the high limit switch.

10. A secondary switch instrument for use in a temperature control system adapted to control the rate of operation of a heat supply device for supplying heat to a space, such as a furnace, which system is of the class which includes a thermostat to be located in said space, and heat supply control means adapted to be electrically controlled by said thermostat to control the rate at which said heat supply device supplies heat to said space; said secondary switch instrument being adapted to be connected between said thermostat and said heat supply control means and so associated with said heat supply device as to be responsive to a condition existing therein, said secondary switch instrument including (a) a high-limit switch adapted to cause the heat supply to be reduced upon the attainment of a predetermined maximum condition in said heat supply device irrespective of the space thermostat, (b) a low-limit switch adapted to cause the heat supply to be increased upon the attainment of a predetermined minimum condition in said heat supply device, irrespective of the space thermostat, and (c) a manually operable switch adapted to control the operation of said heat supply control means, irrespective of the space thermostat, said high-limit switch comprising a switch arm normally in engagement with a contact which is connected to the common member of a plural throw manual switch, said switch arm being arranged to move in response to increase in a condition in the heat supply device from said first contact to a second contact which is adapted to be connected to control the heat supply control device to reduce the supply of heat, said common member of said plural throw manual switch being normally in engagement with a contact connected to a contact arm forming part of the low-limit switch, which low-limit contact arm is normally in engagement with a contact but is movable by condition responsive means out of contact therewith and movable into engagement with another contact, said first mentioned contact being connected to a terminal adapted to be connected to the common line of the space thermostat, said common member of said manual switch being movable at will from its normal contact to a contact connected to a terminal adapted to be connected to the "on call" contact of the space thermostat and connected also to a terminal adapted to be connected to control the heat supply control device to increase the supply of heat, whereby said high-limit switch may reduce the heat supply whether the manual switch is in normal position or in contact with the second contact mentioned, irrespective of the space thermostat, and the manual switch may increase the heat supply only if the high-limit switch arm is in normal position.

11. A secondary switch instrument for use in a temperature control system adapted to control the rate of operation of a heat supply device for supplying heat to a space such as a furnace, which system is of the class which includes a thermostat to be located in said space, and heat supply control means adapted to be electrically controlled by said thermostat to control the rate at which said heat supply device supplies heat to said space; said secondary switch instrument being adapted to be connected between said thermostat and said heat supply control means and so associated with said heat supply device as to be responsive to a condition existing therein, said secondary switch instrument including (a) a high-limit switch adapted to cause the heat supply to be reduced upon the attainment of a predetermined maximum condition in said heat supply device irrespective of the space thermostat, (b) a low-limit switch adapted to cause the heat supply to be increased upon the attainment of a predetermined minimum condition in said heat supply device, irrespective of the space thermostat, and (c) a manually operable switch adapted to control the operation of said heat supply control means, irrespective of the space thermostat, said high-limit switch comprising a switch arm normally in engagement with a contact which is connected to the common member of a plural throw manual switch, said switch arm being arranged to move in response to increase in a condition in the heat supply device from said first contact to a second contact which is adapted to be connected to control the heat supply control device to reduce the supply of heat, said common member of said plural throw manual switch being normally in engagement with a contact connected to a contact arm forming part of the low-limit switch, which low-limit contact arm is normally in engagement with a contact but is movable by condition responsive means out of contact therewith and movable into engagement with another contact, said first mentioned contact being connected to a terminal adapted to be connected to the common line of the space thermostat, said common member of said manual switch being movable at will from its normal contact to a contact connected to a terminal adapted to be connected to the "on call" contact of the space thermostat and connected also to a terminal adapted to be connected to control the heat supply control device to increase the supply of heat, whereby said high-limit switch may reduce the heat supply whether the manual switch is in normal position or in contact with the second contact mentioned, irrespective of the space thermostat, and the manual switch may increase the heat supply only if the high-limit switch arm is in normal position, said common member of said manual switch being further movable to a contact connected to a terminal adapted to be connected to the "off call" contact of the space thermostat and also connected to a terminal adapted to be connected to control the heat supply control device to decrease the supply of heat, whereby the manual switch may also reduce the heat supply irrespective of the room thermostat and of the condition of the low-limit switch.

ALLEN A. DICKE, Jr.

REFERENCES CITED

The following references are of record in the file of this patent:

UNITED STATES PATENTS

| Number | Name | Date |
| --- | --- | --- |
| 1,835,307 | Johnson | Dec. 8, 1931 |
| 2,117,514 | Shipley | May 17, 1938 |
| 2,171,380 | Wedge | Aug. 29, 1939 |
| 2,326,692 | Shipley | Aug. 10, 1943 |